3,408,060
HYDRAULIC SHOCK ABSORBERS
Yoshio Tsuruhori, Kawasaki-shi, and Masaru Sekine, Tokyo, Japan, assignors to Nippon Shock Absorber Co., Ltd., Kawasaki-shi, Japan, a corporation of Japan
Filed Mar. 16, 1966, Ser. No. 534,713
Claims priority, application Japan, Mar. 18, 1965, 40/20,856
5 Claims. (Cl. 267—1)

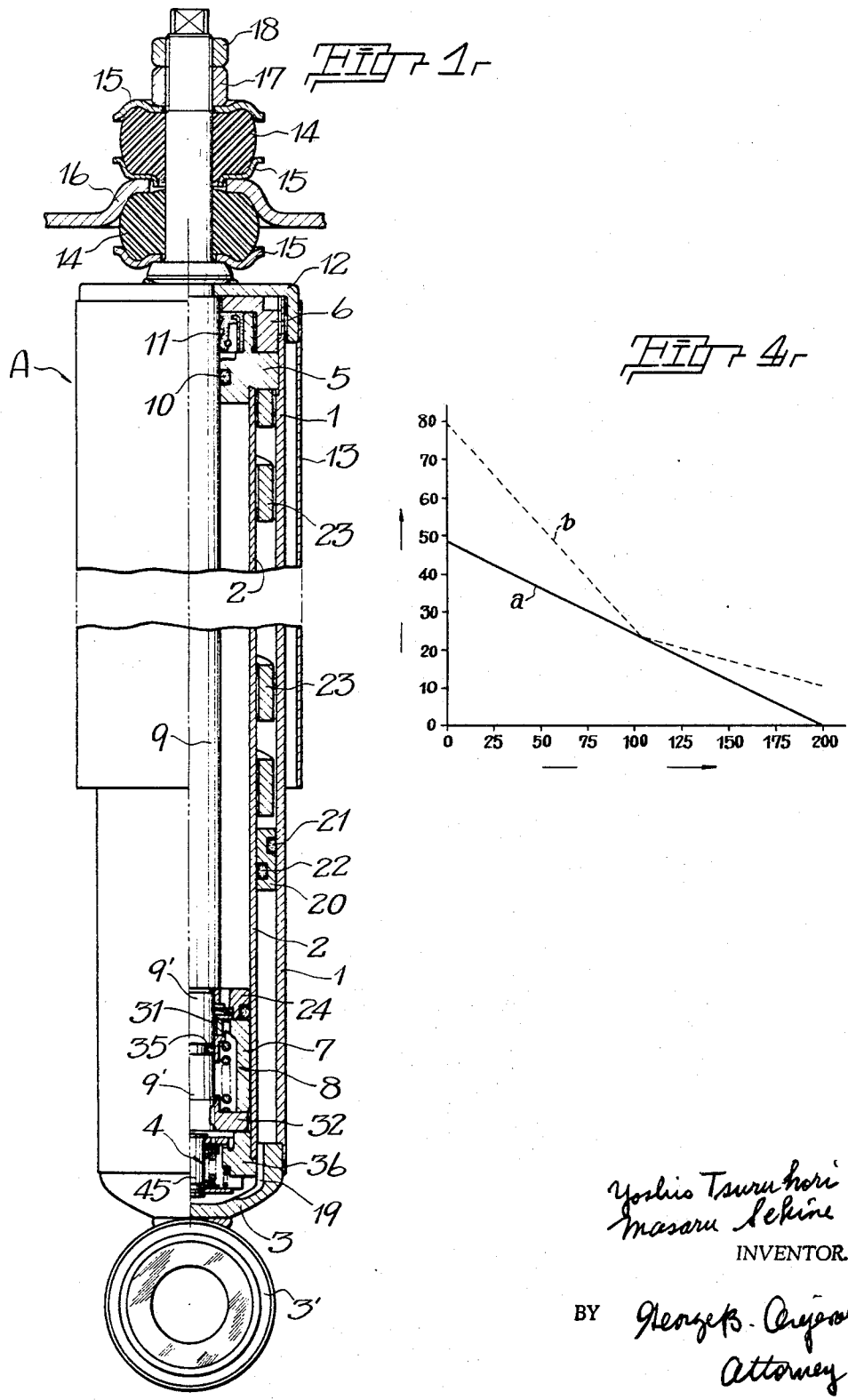

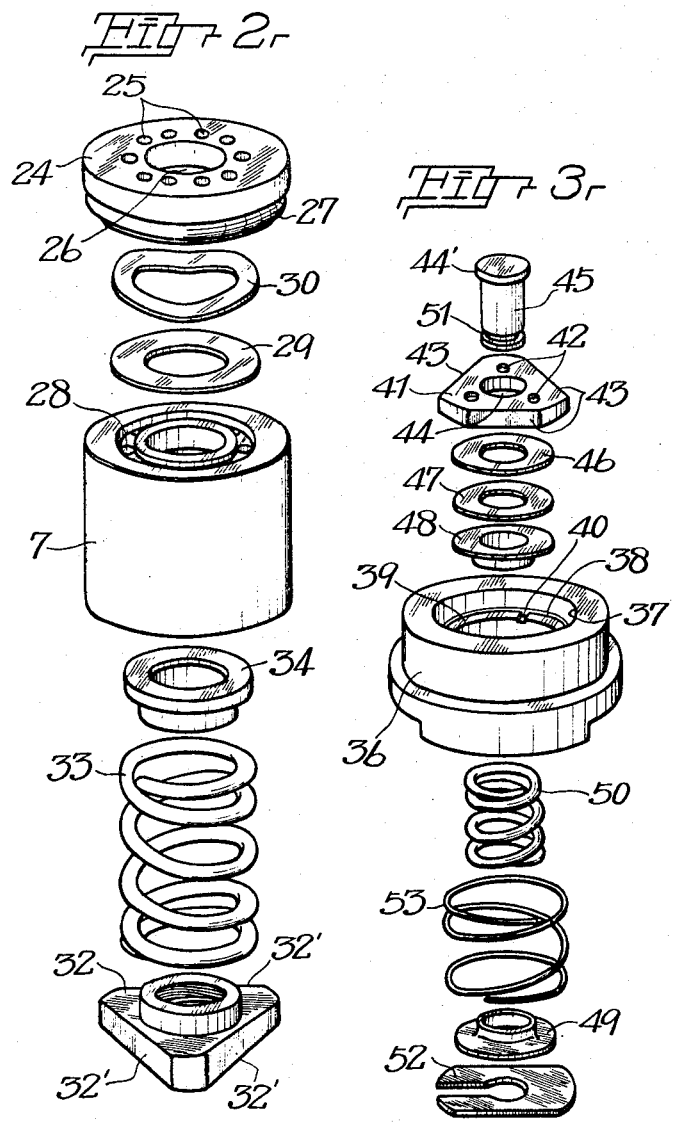

ABSTRACT OF THE DISCLOSURE

In a hydraulic shock absorber, two chambers are separated by a communications member. A by-pass is also provided. There are appropriate flow orifices and two biased valve means. As the piston moves in one direction, the fluid flows across the by-pass forcing one valve means against its bias so as to pass into one chamber. When the piston moves in the other direction the fluid forces the other valve against its bias so as to move into the second chamber.

---

The present invention relates to hydraulic shock absorbers and particularly to hydraulic shock absorbers which are to be mounted between a car frame and a wheel axle.

Conventionally it is known to additionally provide an auxiliary spring to a hydraulic shock absorber mounted between car frame and wheel axle beside the main spring which is also mounted between them. This auxiliary spring, however, is usually placed outside the peripheral member of the absorber and cause it to be bulky.

An object of the invention is to overcome the above drawback and to provide a compact hydraulic shock absorber having good appearance by effectively utilizing narrow spaces.

Another object of the invention is to provide a hydraulic shock absorber capable of effective, reliable damper-ing action.

A further object of the invention is to provide a hydraulic shock absorber of such performance that it acts more strongly when the load is increased beyond a certain boundary point of dampering, and the attenuation is realized slowly with a sufficient stroke.

These and other features of the invention will be apparent from an exemplary embodiment thereof taken in conjunction with the accompanying drawings in which:

FIG. 1 is a longitudinal partial section, partly broken away, illustrating one embodiment of a hydraulic shock absorber according to the invention;

FIG. 2 is a disassembled perspective view, illustrating the details of a flow control to be installed in the hydraulic shock absorber of FIG. 1;

FIG. 3 is also a disassembled perspective view illustrating the details of another flow control to be installed within an inner tube of the hydraulic shock absorber shown in FIG. 1; and FIG. 4 is a graphical representation of the dampering characteristics of hydraulic shock absorbers according to the invention.

Referring now to the drawing, one embodiment of the hydraulic shock absorber according to the invention comprises a main damping body filled with oil, which is generally indicated by A, and which includes a reservoir or outer tube 1 and an inner tube 2 concentrically inserted within the outer tube 1. The lower end of the outer tube 1 is sealed with a sealing member 3 having an attachment part 3'. Within the lower end of the inner tube 2 is inserted a flow control 4. The upper ends of both tubes 1 and 2 are fixedly positioned with respect to each other by means of a positioning member 5, and thereon is screwed a sealing member 6, which may then be fastened by suitable means at several points around its periphery. Within the inner tube 2 is also inserted a piston 7 having other flow control 8 and its piston rod 9 extends through the afore-mentioned members 5 and 6, which have oil seal rings 10 and 11 fitted in their respective friction surfaces to prevent escape of oil. Thus the piston 7 can move together with the piston rod 9 within the inner tube 2.

On a portion of the piston rod 9 outside of said members 5 and 6 is secured a base 12 which carries a dust shield 13 partially surrounding said outer tube 1. Adjacent the top end of the piston rod are provided pats 14 of suitable material such as rubber and their retainers 15 for the purpose of appropriately clamping a portion of the car frame and being fastened by retaining nut 17 and fastening nut 18.

The previously mentioned sealing member 3 which seals the lower ends of both tubes 1 and 2 has an oil passage or oil passages 19 communicating with both tubes, so that the oil under pressure passed through the passage or passages may act upon a free piston ring 20 interposed between both tubes 1 and 2 and having oil seal rings 21 and 22 fitted in opposite walls for frictional movement over and under both tube surfaces. The free piston ring 20 is always pressed back or downward by means of a compression spring 23 disposed within the space defined by both tubes 1 and 2, the free piston ring 20 and the positioning member 5.

The previously mentioned flow control 8 is illustrated in detail in FIG. 2. The piston rod 9 is stepped near its lower end to form a portion 9' having a decreased diameter for receiving a member 24 having communication orifices 25 and a fitting hole 26. The member 24 is provided at its lower periphery with an oil seal ring 27 to effect seal with the inner walls of the inner tube 2. The piston 7 is installed next to and abuts the member 24. The orifices 28 formed in the top wall portion of the piston 7 are normally closed lightly by a valve plate 29 which in turn is disposed within the member 24 and under restraint of the action of a spring washer 30, but the orifices 25 formed in the member 24 communicate with a bypass space 31 between the portion 9' and the top wall portion of the piston 7. The lower end of the piston abuts a push nut 32 which carries a spring 33 which in turn presses against a check valve 34 to close up bypass 31. The check valve 34 is so arranged to make a frictional movement over the portion 9' by means of an oil seal ring, and at the same time it slightly controls the degree of opening of the orifices 28.

From the above description, it will be seen that the flow control 8 controls the flow of the filled oil according to the movement of the piston rod 9 relative to the main shock absorbing body A; when the piston 7 is moved upward by the piston rod 9, oil contained in the upper chamber with the inner tube 2 starts to pass through the communication orifices 25 and rushes into the bypass space 31 to push down the check valve 34 against the restraining force of the spring 33 and is discharged past cut portions 32' of the push nut 32 into the lower chamber. Conversely when the piston is moved downward, oil contained in said lower chamber tends to rush into the orifices 28 via the clearances beside cut portions 32' of the push nut 32, pushes up the valve plate 29 against restraining force of the spring washer 30, and is discharged through the communication orifices 25 into the upper chamber. Therefore, the rapidity of oil flow through the orifices 28 and the bypass 31 depend upon the restraining forces of the spring washer 30 and the spring 33 respectively.

Also the previously mentioned second flow control 4 is illustrated in detail in FIG. 3. The second flow control comprises a member 36 which is held between the inner tube 2 and the lower sealing member 3. The member 36 has a central hole 37 of a large diameter. The hole 37 is enlarged at the upper portion, and within the hole 37 a circular groove 38 is formed by an annular ridge 39, in a portion of which is in turn formed a communication groove 40. The upper surface of the annular ridge 39 is contacted by a member 41 having communication orifices 42 with its peripheral portions cut at 43. The central hole 44 formed in the member 41 is inserted with a pin 45 having a flange 44'. Onto the pin 45 is fitted a valve plate 46, a washer 47 and a spring retainer 48 in the mentioned order. Between the spring retainer 48 and another spring retainer 49 is interposed a spring 50 which pushes against the valve plate 46 to close up the above-mentioned communication orifices 42 from below. The lower spring retainer 49 is set in position by a push plate 52 by pushing the latter from under the former and by locking the latter in an annular groove 51 formed at the lower portion of the pin 45. Between said push plate 45 and the member 36 is interposed another spring 53 having greater flexibility.

The function of this flow control is similar to that of the flow control 8; upon movement of the piston rod 9, oil contained in the lower chamber within the inner tube 2 partly passes through the communication groove 40 and partly builds up pressure within the communication grooves 42 to push down the valve plate 46 against restraining force of the spring 50 and rushes downward. The oil thus expelled from the lower chamber flows through oil passage or passages 19 into the space between both tubes. On the other hand, the passage of oil from below the lower chamber into there is possible only through the communication groove 40.

The oil entering the space between both tubes compresses the compression spring 23 by means of the free piston ring 20, thereby attaining the damping effect. The quantity of oil hereby entering the space between both tubes corresponds to the displacing volume of the piston rod 9, and the corresponding amount of load as well as the shock applied may thus be attenuated.

The compression spring 23 may alternatively be of the type consisting of two portions having different pitches. In such case, the compression spring may be arranged such that the portion with coarse pitch is first subjected to shock bringing forth initial attenuation, and when the pitch of this portion has become the same with the fine pitch of the second portion a further attenuation is effected by the entire length of the spring. Thus, it is possible to obtain a dampering function, where the reaction gets somewhat abruptly stronger when the load is increased beyond a certain boundary point of ordinal dampering, and the attenuation is sufficiently slow under a long stroke.

The dampering function is graphically represented in FIG. 4, wherein graph A is the dampering characteristic for the compression spring with a uniform pitch, and graph B for the compression ring consisting of two different pitch portions.

In addition, as is seen from FIG. 1, the compression spring 23 is made of a wire member of a substantially rectangular cross section. This structure permits increasing spring force of the compression spring which should be disposed within a limited narrow space. Of course, wire members of circular cross section or any other suitable cross section may be employed.

While the invention is described referring to a preferred embodiment thereof, it is to be understood that the invention is by no means limited to the embodiment and changes and modifications may be made without departing from the spirit and scope of the invention.

What is claimed is:

1. In a hydraulic shock absorber consisting of a main damping body filled with oil, said main damping body comprising an outer tube, an inner tube inserted within said outer tube, a bottom member for sealing and making communication between both said tubes, a piston disposed within and sealing said inner tube and capable of frictional movement, a piston rod carrying said piston and extending through a top sealing member, a free piston ring interposed between and sealing both said tubes, and a compression spring disposed within a space defined by both said tubes, said top sealing member and said free piston ring, in combination a flow control means within said inner tube forming upper and lower chambers, said flow control means including a communication member mounted on a piston rod part towards said upper chamber including first orifices therethrough and sealing means so as to seal off said chambers by said member, the communications member being disposed so as to contact said piston, second orifices formed in said piston, a valve plate in said communication member including spring means normally biasing said plate to close said second orifices, a by-pass defined between said piston rod part and the piston, said first orifices communicating with said by-pass, biased valve means, the other side of said piston abutting thereagainst, said valve means being so disposed as to slide over the piston rod and slightly control the opening of said second orifices whereby when the piston is moved upwards oil passes through the first orifice into the by-pass to push on the biased valve means against the restoring force of the bias and is discharged past the biased valve means into the lower chamber and conversely, when the piston is moved downwards, oil in said lower chamber tends to rush into said first orifices past the biased valve means pushing up the valve plate against its bias so as to be discharged in the upper chamber.

2. The hydraulic shock absorber according to claim 1, wherein said compression spring consists of two unequal pitch portions.

3. The hydraulic shock absorber according to claim 1, wherein said compression spring is made of a wire member of substantially rectangular cross section.

4. The hydraulic shock absorber according to claim 2, wherein said compression spring is made of a wire member of substantially rectangular cross section.

5. A hydraulic shock absorber according to claim 1 including a second flow control means interposed between said first flow control means and said bottom member said second flow control means comprising additional spring biased valve means with an outlet permitting fluid flow into the space between the inner and outer tubes so as to compress said free piston ring thereby compressing said spring.

References Cited

UNITED STATES PATENTS

| 2,643,109 | 6/1953 | Wood | 267—1 |
| 3,021,129 | 2/1962 | Maker | 267—1 |
| 3,145,055 | 8/1964 | Carter | 267—1 |
| 3,326,546 | 6/1967 | Otto | 267—64 |

FOREIGN PATENTS

| 632,971 | 2/1962 | Italy. |

ARTHUR L. LA POINT, *Primary Examiner.*

R. M. WOHLFARTH, *Assistant Examiner.*